June 2, 1936. E. J. SWEETLAND 2,042,564
FILTER AND METHOD OF OPERATING SAME
Filed Sept. 6, 1932 4 Sheets-Sheet 1
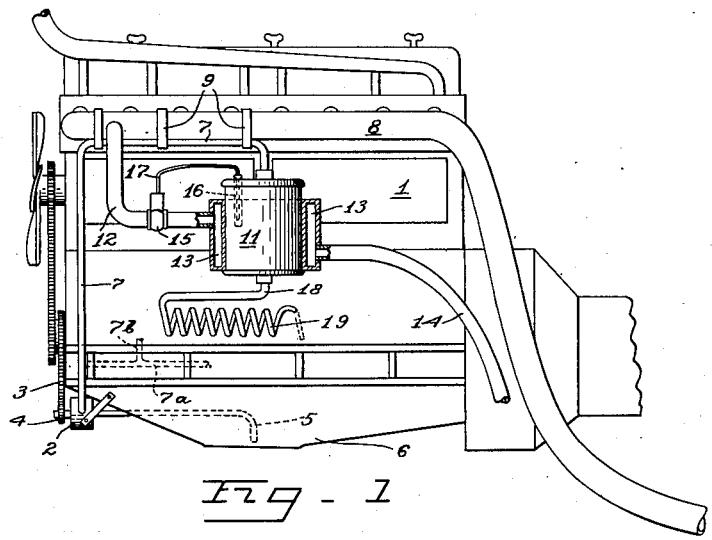
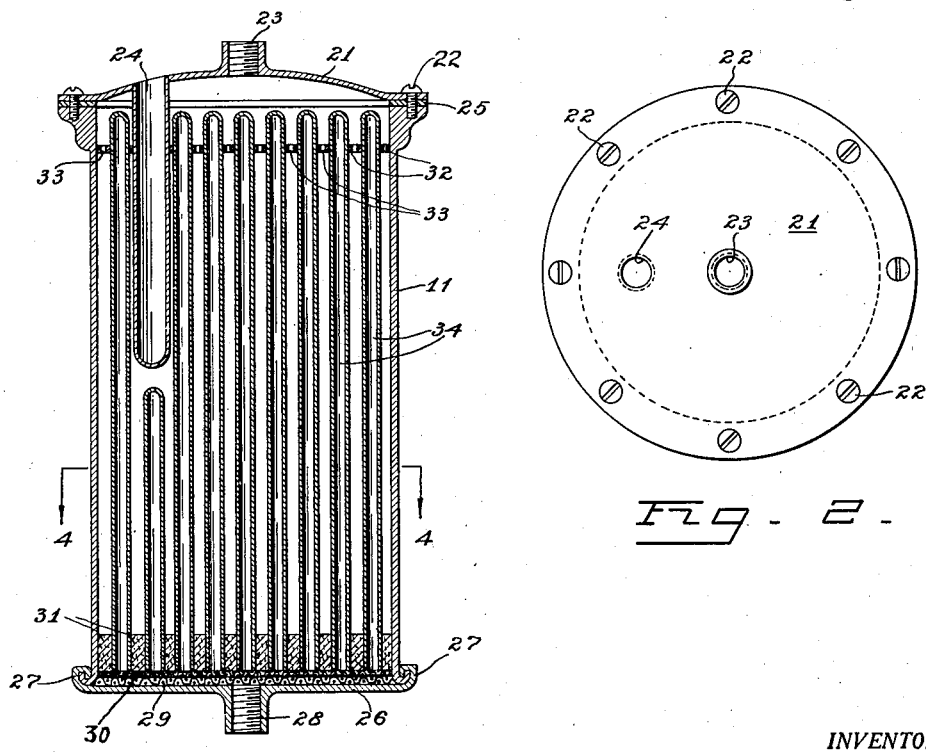
INVENTOR.
Ernest J. Sweetland.

June 2, 1936. E. J. SWEETLAND 2,042,564
FILTER AND METHOD OF OPERATING SAME
Filed Sept. 6, 1932 4 Sheets-Sheet 2

INVENTOR.
Ernest J. Sweetland

June 2, 1936. E. J. SWEETLAND 2,042,564
FILTER AND METHOD OF OPERATING SAME
Filed Sept. 6, 1932 4 Sheets-Sheet 3

INVENTOR.
Ernest J Sweetland

June 2, 1936.    E. J. SWEETLAND    2,042,564
FILTER AND METHOD OF OPERATING SAME
Filed Sept. 6, 1932    4 Sheets-Sheet 4

INVENTOR.
Ernest J. Sweetland

Patented June 2, 1936

2,042,564

UNITED STATES PATENT OFFICE 2,042,564

FILTER AND METHOD OF OPERATING SAME

Ernest J. Sweetland, Piedmont, Calif.

Application September 6, 1932, Serial No. 631,778

10 Claims. (Cl. 210—120)

This invention relates to improvements in filtering apparatus and method of operating the same.

A particular use of my invention pertains to the art of clarifying oil in the circulatory system of internal combustion engines.

Most internal combustion engines are lubricated by pressure feed system or by the splash system or by a combination of both. In either case it is customary to provide a sump or crank case which serves as a reservoir for the surplus oil in the circulatory system. During the operation of automotive engines the oil is contaminated by impurities that work into the system through the breather openings and through the by-products of combustion and burning of the oil in the heated parts of the engine. Further contamination occurs through molding sand and metal scale or chips that may become loosened from the engine parts from time to time. Whatever the source of contamination suspended particles in the oil are detrimental to the engine and it is highly desirable to remove the contaminating materials as promptly as possible after they have collected in the oil.

Manufacturers have long recognized the deleterious effects of suspended impurities in the oil and have long advocated the use of filters on the circulatory system and the discarding of the oil from time to time.

The primary object of the present invention is to provide a method that carries filtration to such a high degree of perfection that the oil in the circulatory system may be used indefinitely without material deterioration so far as suspended impurities are concerned. In fact, the customary periodical draining of automobile engine crank cases which is now universally practiced and which results in the waste of hundreds of millions of gallons of oil per year, can be eliminated entirely by the use of my invention.

One of the important objects of the present invention is to provide a filter that is of sufficiently fine texture to remove all of the suspended solids in the oil and which will at the same time be unaffected by the high tempertures necessary to reduce the viscosity of the oil to the desired degree for efficient filtration. In this connection it should be explained that a large percentage of the deleterious solids are in the form of carbonaceous or asphaltic slimy residues that may be colloidal in fineness and thus highly resistant to filtration. When such materials are filtered through a filter medium fine enough to retain them, a filter cake of extremely fine texture and high resistance to filtration is formed. Such filter cake is so slimy in texture as to be almost impervious to cold lubricating oils even under high pressure. Consequently in order to maintain the desired rate of filtration it is necessary to reduce the viscosity and this is best accomplished by the application of heat. It has been found however, that the customary filter medium used in automotive engine filters and which is made of cotton or other organic materials rapidly deteriorates when subjected to high temperatures over a long period of use. It is one of the objects of the present invention to provide a filter which is applicable to use on automotive engines which is unaffected by heat and even by acids which exist to a slight degree in the lubricating system of certain engines.

It is a further object of the present invention to provide a filter medium of such extremely fine texture as to be able to break down emulsions and thus separate water which occurs in the oil system under certain conditions, particularly in cold climates.

A further object is to provide heating means for the filter and means of controlling the heat within the filtering system.

A further object is to provide a system wherein a portion of the oil is first removed from the circulatory system, then heated and filtered and finally cooled again before it is returned to the system A further object is to provide a filter medium which is of such extremely fine texture that the contaminating materials even when of a colloidal degree of fineness, are retained substantially at the surface of the filter medium instead of being allowed to penetrate to a point which tends permanently to clog the filter elements and preclude the possibility of cleaning them. In this connection it should be understood that a considerable percentage of the contaminating slime is so fine in character that it will pass rapidly through such filter materials as felt and ordinary cotton filter fabrics without being arrested so that when such materials are used they hold only the coarser particles and permit the extremely fine particles to remain in the circulation at least until a slime bed has been formed to aid filtration; but if to overcome this difficulty the use of extremely dense filter fabrics is attempted the experimenter is confronted first with the great expense of such fabrics and second by the fact that however tightly they are woven the colloidal slime particles penetrate to a considerable depth in the fabric and gradually materially restrict the flow, and at the same time so completely fill up the interstices below the surface of the fabric that they cannot be removed by any practical method of cleaning. As will be pointed out further on, the filter medium herein employed is of such minutely fine texture that substantially all of the solids remain upon the surface, and experiment has indicated that when such solids are built up in a filter cake upon a porcelain medium such as I employ, the particles appear to arrange themselves in a manner that permits long continued filtration much more satisfactorily than is the case with a filter medium which may be much more porous before being placed in service, but which rapidly clogs due to the particles penetrating below the surface of the material.

A further object is to provide a filter having a filter medium of unglazed porcelain or similar ceramic material in such form as to be inexpensive to manufacture and to present the maximum amount of filter surface in the least possible space.

A further object is to provide a filter for use on internal combustion engines wherein the heat of the oil during filtration is thermostatically controlled.

A further object is to provide a filter having tubular filter elements suitably assembled into a header so that the entire filter assembly may conveniently be removed and replaced from the filter casing as a unit.

A further and very important object is to provide a filter for the purposes described wherein two distinct types of filter medium are employed within the same filter casing. One of these mediums is of extremely fine texture such as unglazed porcelain and the other is a comparatively coarse medium such as felt or paper pulp. The objects and advantages of such construction will be explained in detail further on.

A further object is to provide for the automatic stoppage of flow through a filter element that may be defective in manufacture or accidentally become broken during the use of the filter as will be explained in detail further on.

A further object is to provide a filter having elements made of earthen material with an auxiliary protective filter element that will prevent any chips or gritty particles that may be detached from a filter element from escaping from the filter casing.

A further object is to provide a filter assembly wherein a plurality of tubes made of porcelain or pottery are assembled in discs or holders of a non-rigid material which prevents placing a physical strain upon the filter elements and thereby avoids breakage of such elements both in handling and in use.

A further object is to arrange an assembly of porcelain or pottery filter elements within a metallic casing in such manner that the difference in the coefficient of expansion of the ceramic materials as compared with the metallic casing is compensated for without placing the ceramic materials under strain.

Referring to the drawings:

Figure 1 represents a typical installation of the filter in connection with an automotive internal combustion engine.

Figure 2 is a plan view of the filter casing removed from the engine.

Figure 3 is a sectional elevation of the filter showing the interior construction.

Figure 4:
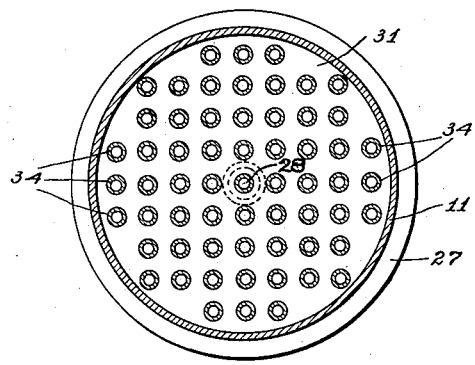
Figure 4 is a sectional plan view taken along the lines 4—4 of Figure 3.

Referring in detail to the drawings the numeral 1 indicates an automotive engine of any standard construction. 2 is an oil circulating pump driven by the belt 3 and pulley 4. This pump receives oil through the suction pipe 5 which terminates in the sump or the crank case 6. The oil is delivered through the discharge pipe 7 which is secured to the exhaust manifold 8 by means of clamps 9 and is thus fixed in a position to be heated by the exhaust pipe to increase the temperature of the oil in transit to the filter body 11. Suitable pressure regulating and indicating means such as loaded valves or by-pass valves and pressure gauges may be employed in connection with the tube 7, but as these are well known in the art, it is not deemed necessary to illustrate and describe them in this application. The tube 7a with its lateral branch 7b diagrammatically represents a branch tube leading off from the discharge pipe 7 for the purpose of supplying oil to the various bearings in the engine where the pressure feed system of supplying oil to the bearings is employed. The oil within the filter casing 11 is maintained in a heated condition by the exhaust gases passing through the pipe 12 into the jacket 13 which forms an annular chamber around the filter casing and out of which the exhaust gases are allowed to escape through the pipe 14. 15 is a thermostatically controlled valve in the pipe 12 which is actuated by a thermostatic bulb 16 which communicates with the valve 15 through the tube 17. 18 is the discharge pipe for filtered oil which leads from the filter casing 11 back into the crank case through the cooling coil 19.

Referring to Figure 2, 21 is the cover of the filter casing which is held in place on the casing by means of screws 22. 23 is a suitable threaded opening to receive the oil feed connection to the filter and 24 is a well for thermostatic bulb for use in controlling the temperature of the oil during filtration.

In Figure 3 the cover 21 and its attendant parts are clearly shown together with gasket 25 which forms a sealed joint between the cover and the casing 11. The lower cover 26 of the filter is held to the casing 11 by the crimped joint 27 and is provided with oil discharge opennig 28. Adjacent to the cover 26 is a disc of perforate material, such as wire screen 29, which permits drainage of the oil from the various tubes through the discharge opening 28. Lying next to the disc of screen is the layer of filter fabric 30 which may be a closely woven filter cloth of cotton, wool or asbestos. This is cemented to the header 31 with a suitable adhesive such as sodium silicate. The disc 31 is made of felt or paper pulp or other suitable material and performs the important function of holding the tubes in position for filtering without placing any undue strain upon them, while at the same time the felt between the tubes acts as a rapid filter medium, the function of which will be more fully described later. This disc is shown in further detail in Figures 9 and 10. The opposite ends of the tubes are held in place by a thin layer of felt, pasteboard or similar material designated in the drawings by the numeral 32. The disc employed for this purpose is preferably of a soft material that will yield readily to accomodate itself to slight variations in the shape of the tubes during the assembling process. The disc 32 is provided with a number of perforations as illustrated at 33 and these in addition to the liberal clearances around the tubes and at the periphery provide ample openings for the oil entering through the inlet 23 to circulate about the filtering tubes.

The filter tubes themselves are designated by the numeral 34 and are shown in sectional elevation in this figure. As the nature of these tubes is of vital importance in this invention, their construction will be described in detail. For convenience of description I shall throughout this specification and claims refer to the tubes as being made of unglazed porcelain or merely as porcelain regardless of the application of those terms in various arts where the composition of materials forming porcelain may vary to a wide extent. As to the composition, I do not limit myself to any specific mixture as I have found by experiment that the formula may vary through rather wide limits and still produce satisfactory results. The prerequisites of the composition employed are that it must be porous after firing and that it must be sufficiently cohesive and plastic in its nature as to lend itself readily to being extruded into tubes of suitable size for use which in my preferred form of construction are about $\tfrac{3}{16}$ of an inch in external diameter and have an internal diameter that may vary from $\tfrac{1}{8}$ to $\tfrac{3}{32}$ of an nch. The composition which I prefer for the manufacture of these tubes is about 50% English ball clay and 50% very finely ground flint of the character commonly employed in porcelain manufacture. I prefer to use flint of which at least 95% will pass a 100 mesh screen and 85% or more should pass a 200 mesh screen.

In manufactluring the tubes the clay is first freed from foreign substances by customary methods and the flint and clay mixed on a dry weight basis of 50% each. Other materials customary in porcelain manufacture, such as kaolin and feldspar may be used in varying percentages if desired and each change in composition tends to vary the strength and porosity of the filter elements to a certain extent, but since the simple mixture of flint and ball clay produces satisfactory results I do not consider it necessary to complicate the formula, although I reserve the right to use any of the well known ceramic materials in my composition. In fact, there are no doubt clay compositions which occur in nature without the admixture of other materials which have the desired extruding properties and which when fired are sufficiently porous to fulfill the requirements. I have found that the porosity of the finished porcelain may be increased by the addition of small percentages of corn starch or charcoal, or other organic material which increases the interstitial spaces by burning out during the firing process. Such increased porosity increases the initial rate of filtration and decreases the resistance of the elements and therefore may be employed either where an increased initial rate of flow is desired or where it is desired to clean the elements by forcing a fluid such as compressed air through the tubes in reverse direction.

When ball clay and flint are used, the mixture of clay and flint is preferably introduced into a ball mill where it is thoroughly mixed and ground together with an excess of water after which they are freed from the excessive water by any convenient method such as forcing the mixture into a filter press. After removal from the filter press the mixture may be further mixed in a pug mill or similar device and formed into suitable slugs that may be piled together in storage where they are "seasoned" and held for future use. When withdrawn from storage the moisture content is adjusted to give the desired plasticity for extrusion. This may be done either by adding more water or by removing a portion of the moisture by air drying or by bringing the mixture in contact with an absorbent surface such as large slabs of plaster of Paris which absorb a portion of the moisture from the mixture. It is important before the mixture is introduced into the extrusion chamber to remove air bubbles as completely as possible as such bubbles produce defects in the finished tubes. On a small scale the air may be removed by forcibly throwing the batch upon a table, cutting it into two parts, then throwing one of the parts forcibly against the other. This operation is repeated over and over until the desired result is obtained. On a large scale I prefer to use a pug mill which is larger in diameter at the top than at the bottom and provided with a central shaft having a plurality of cross arms throughout its length that are bent at an angle so as to constantly urge the clay toward a horizontal discharge opening at the bottom. This opening may be of the same diameter as the chamber of the extrusion press that is finally used for the extrusion of the tubes and this may be from 6 inches in diameter upwards, depending upon the scale of manufacture. The opening at the bottom of the pug mill is provided with a gate so that the mixture may be worked as long as desired in the pug mill with the gate closed and then the gate is opened and the downward urge produced by the slowly rotating arms of the mill forces the clay from the opening in solid cylindrical form which may be cut off into suitable lengths to be introduced into the chamber of the extrusion press. To promote removal of air from the clay mixture while it is being worked in this pug mill I may enclose the entire pug mill and its contents in a vacuum receiver which is exhausted of air during the operation. Since the process of extruding clay and other materials in hollow tubes is well known and since the degree of moisture required to obtain good results is readily obtained by experiment and may vary with different clays, minute description of the extruding process is not required in this specification. Any extrusion press provided with one or more nozzles having a diameter of the proper size, say 1/8" and a core for forming a hole 3/32 to 1/32 of an inch in diameter will produce satisfactory results with the clay mixture above specified. I do not limit myself to any particular size of tubing as satisfactory filtering results may be obtained with tubes of any size, but in automotive oil filtration through a filter medium of such extremely fine texture a large filter area, usually from 3 to 10 square feet, is required and this area must be enclosed in a container of small size and I have found that tubes 1/8 of an inch in diameter are sufficiently strong to stand handling and yet are small enough so that a very large area may be mounted in a comparatively small container. A casing 6 inches in diameter and about 12 inches long will accommodate 126 1/8 inch tubes on suitable spacing and afford a filter area of about 10 square feet, and a filter of this size is suitable for use on a large automobile or truck to remove the solids from the oil over a period of several thousand miles driving under ordinary circumstances.

After the tubes have been extruded they are allowed to partially dry and when they reach a point of dryness known to potters as "leathery" consistency the tubes are cut to the desired length and if the construction illustrated in Figure 3 is to be followed one end of the tubes is closed either by pinching them shut or by capping the end with a small piece of clay. They are then dried and fired to approximately 1950° F., the heat preferably being raised slowly to that temperature over a period of 3 or 4 hours. When cool they are removed from the furnace and are ready for use.

Referring to Figure 4 which is a cross section of Figure 3, 34 represents the porcelain tubes, 11 the casing and 27 the folded joint which secures the lower head to the casing. 31 is the felt disc or header into which the tubes are secured and it should be noted that this disc fits snugly within the casing so that no oil may pass by and escape through the discharge opening 28 unless it passes either through the felt or through the porcelain tubes.

Figure 5:
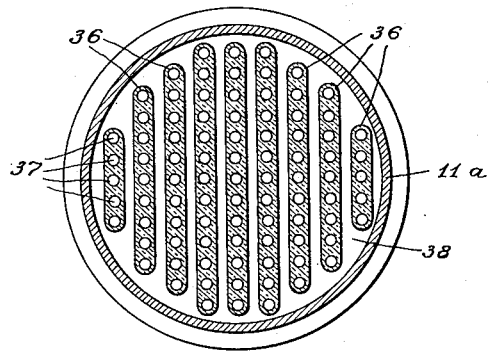
Figure 5 is a sectional view of a filter employing a flat element in place of the circular tubular element shown in Figures 3 and 4.

Referring to Figure 5 I have illustrated a modified form of my invention wherein the porcelain is formed into flat slabs or plates 36 and each of these elements is provided with drain holes 37. When flat filter elements of this type are employed they may be mounted in felt through which slotted openings have been punched to receive the elements in the same manner that the tubes are secured in the felt disc 31 of Figure 3. In the event that the flat elements are employed however, I prefer to use cement to secure the elements in the felt and thus prevent leakage between the felt and the elements. A cement that is suitable for this purpose may be made from a mixture of kaolin and sodium silicate mixed to a creamy consistency.

In Figure 5 the felt header is designated by the numeral 38 while the casing is represented in section by the numeral 11a.

Figure 6:
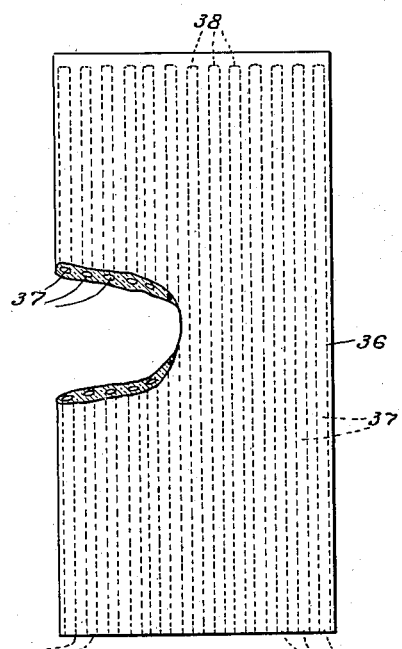
Figure 6 is a side elevation of an element such as is shown in section in Figure 5.

Figure 6 is a side elevation of one of the elements represented in Figure 5. In this view a portion is broken away to better illustrate the drainage openings 37 which are open along the bottom of the element 37a and are stopped off near the top at the point 38.

Figure 7:
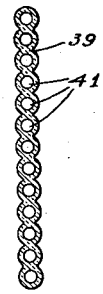
Figure 7 is a sectional view of a modified form of flat element wherein the surface is indented or scalloped in order to reduce weight and increase filter surface.

Figure 7 is a modified form of porcelain filter element wherein the outer walls are corrugated as shown in order to reduce weight and increase the filter area. In this instance 39 designates the porcelain wall of the element and 41 the drainage openings.

Figure 8:
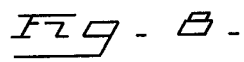
Figure 8 is a section of a tubular element with longitudinal corrugations which increase the filter area per unit of weight.

Figure 8 is a further modification of the extruded porcelain filter tube which I may substitute in place of the circular form illustrated in Figure 3. In this figure the porcelain walls are designated by the numeral 42 and a drain hole by the numeral 43.

Figure 9:
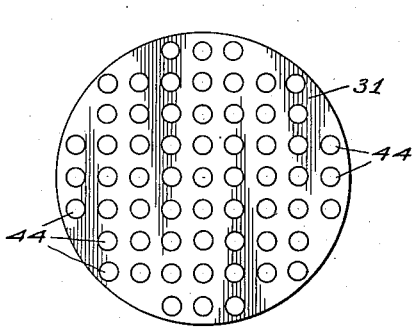
Figure 9 is a plan view of a perforated disc of felt or other material which serves the dual purpose of holding the porcelain filter tubes and at the same time serves as a rapid filter element.

Figure 9 represents a plan view of a felt or paper pulp disc or header such as is employed in the filter illustrated in Figure 3. In this figure the body of the disc is represented by the numeral 31 and the holes into which the tubular elements are inserted are represented by the numeral 44.

Figure 10:
Figure 10 is a sectional elevation of Figure 9.

Figure 10 is a sectional elevation taken on the horizontal center line of Figure 9 and corresponding numerals are employed to designate the parts of the element.

Figure 11:
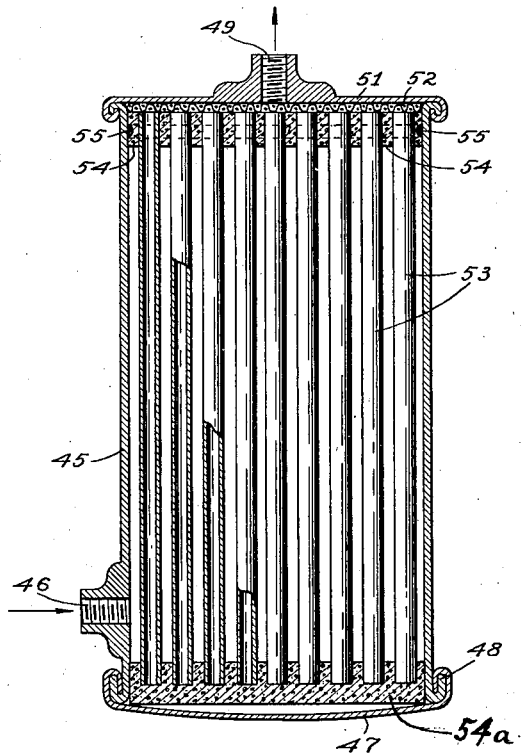
Figure 11 is a vertical sectional elevation of a filter wherein the tubes are supported in a cement block or header at either end.

Figure 11 represents a modified form of filter which carries out the same principles as those employed in Figure 3 but in a somewhat different manner. In Figure 11, 45 is the wall of the filter casing which is provided with inlet opening 46 and cover 47 which is held in place by the crimped and soldered joint 48. 49 is the outlet for filtered oil which is attached to the cover 51. Underneath this cover is the drainage screen 52 which permits free flow of oil from all of the porcelain tubes to the outlet opening 49. In this construction the porcelain tubes 53 are first set with their ends in a circular mold while the tubes are held in properly spaced relation to each other in a suitable holder. Into the mold is then poured a suitable cement which is allowed to dry to form the header or disc 54. For this purpose I may employ any hard setting cement such as plaster of Paris or a mixture of Portland cement sand and sodium silicate. The mold employed is so constructed that the ends of the tubes remain open while the cement flows about the outer surface of the tubes and tightly unites them into a group which neatly fits into the casing. The group of tubes thus united is turned end for end and a similar block of cement 54a is cast to unite the opposite ends of the tube in a similar manner except in this instance the tubes are held above the bottom of the mold so that the cement effectively closes the ends thereof. This comprises a group of porcelain tubes tightly united into an assembly with a disc of cement at each end and this disc neatly fits into the filter casing. The disc 54 at the discharge end is provided with a circumferential packing groove into which a ring of suitable packing such as felt or cotton wicking 55, is employed to form a joint between the header and the filter casing to prevent the escape of unfiltered oil. Rubber or other material which expands when subjected to heated oil may be employed in this packing groove to more fully insure a tight joint. The block 54a is a sliding fit in the casing so that the lengthening of the casing 45 due to expansion from heat does not tend to place a strain upon the tubes 53.

Figure 12:
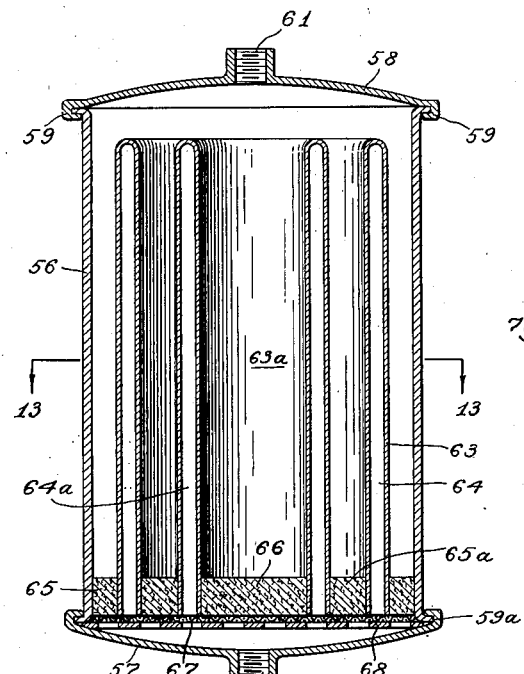
Figure 12 is a vertical sectional elevation of a modified form of the invention.

Referring to Figure 12 which is a further modification of my invention, the numeral 56 designates a cylindrical casing provided with the cover 57 at its lower end and 58 at its upper end. Both of these covers are crimped and soldered into place at the joints 59 and 59a. 61 is an inlet opening and 62 the outlet for the filtered oil. In this modification filtration is performed by a plurality of annular concentric porcelain elements 63 and 63a. Each of these elements is provided with a plurality of drainage openings 64 and 64a which are further illustrated in the sectional view in Figure 13. These elements are held in position by the annular felt rings 65 and 65a while the felt plug 66 is inserted in the center of the smaller element. While only two porcelain elements are illustrated in this figure, it should be understood that any desired number may be employed. 67 is a drainage screen and 68 a perforated plate to support the filter structure.

Figure 13:
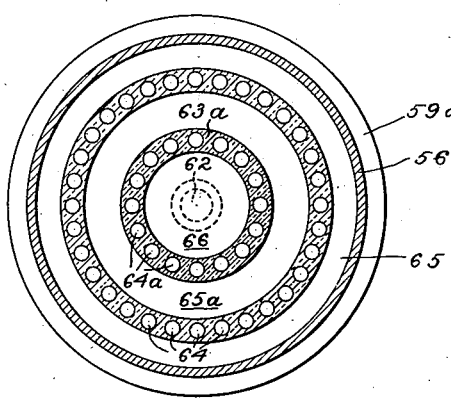
Figure 13 is a horizontal sectional view taken along the line 13—13 of Figure 12.

Since Figure 13 is a cross section of Figure 12 and as similar numerals are employed to designate the parts, no further description of this figure is required.

Figure 14:
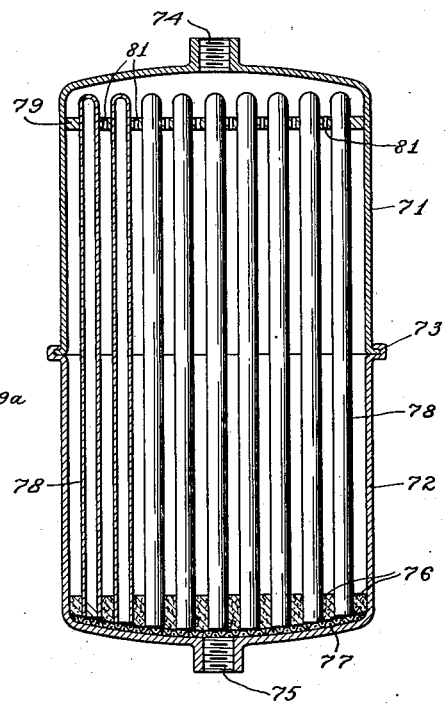
Figure 14 is a sectional elevation of a modified form wherein the filter casing is made from drawn shells.

Figure 14 is a further modification wherein a drawn shell is formed in two halves 71 and 72 which are united by the crimped joint 73 after the filter elements have been assembled in place. In this construction the inlet for unfiltered oil is through the opening 74 and the filtered oil passes out through opening 75. The disc of felt 76 which holds the filter tubes in place is made with a convex lower surface to conform to the shape of the shell and is separated therefrom by the screen 77. The porcelain tubes 78 which are of the construction heretofore described are held in spaced relation to their upper ends by the thin perforated felt disc 79 which is provided with a plurality of perforations 81 which permit the free entrance of the oil to the space surrounding the tubes. In this modification the shells are drawn of slightly smaller diameter at the closed ends than at the open ends and when the tubes are assembled in the felt or paper pulp headers 76 and 79 they are readily forced into the shells until the convex felt header 76 seats itself securely around the sides of the casing and against the screen 77 thus insuring that no oil may escape through the opening 75 without first passing through the felt, or through the porcelain tubes.

Figure 15:
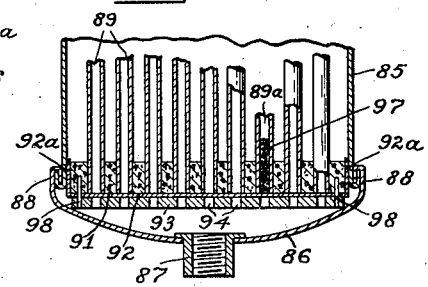
Figure 15 shows a modified method of supporting the tubes in the filter.

Figure 15 shows a modification of the invention and is intended particularly to illustrate a special method of mounting the porcelain tubes so that in the event that a tube should be broken while the filter is in use, the leak caused by such breakage will be automatically healed while the filter continues in normal use. Referring to the drawings, numeral 85 designates the casing of the filter which is provided with cover 86 having the oil outlet fitting 87, the cover being held to the casing by the folded and soldered joint 88. In this modification the porcelain tubes 89 are cemented into a perforated header 91 which is of the general shape illustrated in Figures 9 and 10, but in this instance the header may be made of pasteboard or "chip" board, or any suitable material of that character. I find that a mixture of sodium silicate with from 10% to 20% fine clay and about 5% zinc oxide makes a suitable cement for securing the tubes in the header. After the tubes have been cemented into the header, a disc of cotton fabric such as canton flannel and somewhat larger in diameter than the header is cemented with sodium silicate to the front of the header. This cloth disc is represented by the numeral 92 and serves the dual purpose of acting as an auxiliary filter medium by forming a joint between the periphery of the header and the walls of the casing as shown in the drawings at the point 92a. In applying this canton flannel or other fabric to the face of the disc 91, it is important that the cement be applied only to the face of the disc and not to the cloth as otherwise the pores of the cloth would be filled up and filtration retarded. Supporting this cloth and the assembly of tubes associated with it is the perforated metal plate 93 the periphery of which rests against the cover 86. It should be noted that the perforations of the disc 93 register perfectly with the openings of the porcelain tubes 89 so that the oil which slowly filters through the tubes and which is perfectly clear after passing through them, passes through the cloth 92 out through the perforations 94 and finally out of the casing through the outlet 87. Since all of the oil which passes through the porcelain and thus finds its way to the interior of the tubes 89 is perfectly clear, cloth 92 offers practically no resistance to the exit of this clear oil, but in the event that a defective tube should accidentally be placed in the assembly and dirty oil would thereby pass through the tube, the solid particles in such dirty oil soon build a slimy cake on the inner surface of the cloth 92 and soon the small area exposed to such dirty oil is choked up and filtration through the defective tube eventually ceases. The same thing happens in the event that one of the tubes should become broken in use. In that event unfiltered oil would rapidly channel through the broken tube and quickly deposit solids upon the small exposed area of the cloth 92 with the result that flow through the broken tube would soon be discontinued entirely due to the resistance of solids accumulating on the surface of the cloth. For purposes of illustration the porcelain tube 89a is assumed to have become broken after the filter was placed in service on an engine. The rapid flow of dirty oil which flows through the broken tube deposits its solid matter on the small area of cloth opposite the opening of that particular tube until it becomes clogged by an accumulation as represented at the point 97. Any further flow through this particular tube is almost, if not entirely, shut off. Meanwhile the portion of the cloth 92 in front of the tube 89a has protected the engine against the escape of any fragments of the broken tube or of any other particles that may be large enough to do any damage to the engine.

The effect of the auxiliary filter cloth 92 is enhanced by the perforated plate 94 because the pressure within the filter casing 85 tends to press the header 91 into firm contact with the plate 93 so that the walls of the perforations 94 of the plate 93 cooperate with the cement which secures the cloth to the header by supporting the cloth in such manner that the solids 97 deposited in the interior of the porcelain tube cannot spread out between the header and the perforated plate. 98 designates dowel pins which insure registration of the openings 94 with the tubes 89.

The amount of filter area required in any instance depends upon the size of the engine and the period of service through which the filter is intended to operate without cleaning or replacement, and this period of service may vary considerably depending upon the type of fuel and the character of oil used in the circulatory system. It may be said, however, that for automotive engine use where it is desired to run the vehicle over a distance of several thousand miles without cleaning or replacing the filter, the porcelain area should not be less than double the combined piston area of the engine and even a much larger area may be employed to advantage.

The method of operating the filters is substantially the same in all of the modifications.

The filter casing 11 is installed upon the engine in such a position that the temperature of the oil will be raised to at least 150° F. and preferably to a temperature ranging between 200 and 300° F. This is readily accomplished by employing waste heat from the exhaust gases with the apparatus illustrated in Figure 1. When the engine starts pump 2 is automatically placed in operation drawing oil from the sump of the engine through tube 5 and forcing a portion of it to the engine bearings through the tubes 7a and 7b and another portion through the tube 7 into the filter casing where the oil is heated by exhaust gases passing through the pipe 12, valve 15 and into the jacket 13 and out through the pipe 14. The pump and piping system is preferably arranged to maintain a pressure that may vary anywhere from 20 lbs. per square inch to 60 lbs. per square inch within the filter casing. As the viscosity of the oil is greatly reduced by the heat the pressure forces it through the walls of the porcelain tubes 34 and it drains downwardly and out through the opening 28 (Figure 3) through the cooling coil 19 and back into the circulatory system. The inner end of the tube 19 may be located so as merely to return the oil to the sump or it may be directed to one or more of the bearings of the engine as may be desired. The valve 15 which admits heated gases into the spaces 13 is controlled by the thermostatic bulb 16 and this valve and bulb are so adjusted as to cut off the heat at a predetermined point, say 300° F. which insures against overheating and consequent injury to the oil; if the heat exceeds that temperature the thermostatic valve is automatically closed until the temperature drops to a predetermined point when the pressure in the bulb 16 is reduced causing the valve 15 to open again.

An important phase of the invention as illustrated in Figures 3, 12, and 14 resides in the combination of a comparatively free filtering material such as felt or paper pulp with an extremely dense filter medium such as porcelain within the same casing, or upon the same filter line. This may be explained by the fact that there are two classes of filtration to be performed in connection with an internal combustion engine. In the first place there are the coarse deleterious particles such as metal chips, granular dust particles and the like which are free filtering and easily arrested by a comparatively coarse filter medium such as felt, paper pulp, cotton waste and many similar materials. On the other hand, there is another class of deleterious solids which are so extremely fine that they pass through the very porous filtering materials just mentioned without being arrested. These solids include the very fine carbonaceous slime produced by the decomposition of oil and fuel and these solids while less abrasive than the former class are nevertheless injurious for they dilute the oil, render it much more susceptible to emulsification with moisture which accumulates within the crank case (especially in cold climates) and have a tendency to increase the formation of carbon on the cylinder heads of the engine, for the solids contained in the oil naturally remain as a residue when the oil is evaporated by heat from the cylinder heads and other heated parts.

Now it is the nature of a viscous oil such as is used in automotive engines that its rate of filtration through porcelain, especially after the porcelain has become coated with carbonaceous slime, is comparatively slow. Therefore if porcelain alone is employed the flow of oil through the filter is comparatively small, especially before the oil has become hot. With a small turnover of oil through the filter a particle of grit in the circulation may possibly be returned to the bearings several times before it is arrested by the filter. On the other hand, if the entire filter is of such free filtering qualities as to permit a large turnover of oil and thus promptly arrest each large particle of grit, then a large percentage of the extremely fine carbonaceous slime will readily pass through the filter without being arrested. It is one of the purposes of the present invention to have the oil circulate through the filter at such a rate that the suspended solids are removed at substantially the rate they are formed in the oil. In the combinations illustrated in certain modifications of my filter herein described, such as Figures 3, 12, and 14, the filter performs the important dual function of rapidly removing the coarse particles by filtration through the felt or paper pulp while removing the fine slime by filtration through the porcelain elements. In this connection, it should be noted that the area of the felt or similar material is very small in comparison with the area of the porcelain. In fact, where this method, which I call "dual filtration", is employed, it is very important to correlate the area of the coarse medium such as felt, to the fine medium such as porcelain, in such manner that both perform their proper function. The ratio of felt area to porcelain area cannot be exactly stated without knowing the density of the particular felt to be used and it therefore follows that the density of the felt must be correlated with the area of both filter media in order to give the best results. The rule to be guided by is that the area and density of the felt must be so correlated with the area of porcelain and the pressure in the filter casing that there will always be sufficient resistance in the felt to maintain a high enough pressure in the filter casing to produce a satisfactory rate of flow through the porcelain.

I have found when using a fairly firm grade of what is commonly known as wool felt one-half inch in thickness and placing four to five porcelain tubes $\frac{7}{16}$ of an inch in diameter and 10 inches long per square inch of felt area, that satisfactory results are obtained. With such a ratio the oil filters quite rapidly through the felt but still the felt offers sufficient resistance to build up pressure that will force the heated oil through the porcelain. It will be understood since the porcelain has a very high resistance that if the ratio of felt to porcelain is too greatly increased, the small pumping capacity available on an automotive engine would not be sufficient to build up a pressure within the casing, with the result that the porcelain area would be almost, if not entirely, ineffective. While the method of "dual filtration" is conveniently carried out by the methods above set forth, it is within the province of this invention to employ other means, such for instance, as placing a very porous filter medium such as felt or cotton waste in one container and placing the denser filter medium, such as porcelain, in another container, both of which may be connected on the same pipe line and supplied with oil by the same pump.

When a filter with removable head such as illustrated in Figure 3 is employed the filter may be cleaned from time to time by first removing the casing from the engine then removing the cover 21 and spacing member 32 after which cleaning may be accomplished by projecting a fluid such as distillate, kerosene or gasoline into the spaces between the tubes and thus wash out the accumulated solids. Other well known means of cleaning a filter element, such as by reverse current of air or fluid, or by scraping may be employed in the various types and modifications thereof without departing from the spirit of my invention.

When the type of filter illustrated in Figures 11, 12, and 14 is employed, it is the intention to manufacture the filter casing of light inexpensive materials so that the entire casing with its contents of accumulated solids may be discarded at intervals and replaced by an entirely new filter for by the method of manufacture herein described very efficient filters of large area may be produced at very low cost.

It should be understood that filters for automotive engine use must be comparatively small in size and low in cost of manufacture and an important feature of this invention resides in the method of using a high grade filtering material such as porcelain in a manner which permits of very large area in a small space and of extremely simple manufacture. I realize that pottery and similar earthen products have long been used as filter media in other classes of work but the methods in which they have been employed would not lend themselves to filtration of oil on internal combustion engines for none of the methods heretofore employed would permit the use of a sufficiently large area in a small casing, nor would they lend themselves to economical manufacture. Furthermore, where a filter is to be used on an automotive engine it is not only important to have the filter medium perform its filtering function but to have it so disposed that it will not be injured either by vibration of the vehicle or by strains set up by variations in temperature. It will be noted particularly in the forms illustrated in Figures 3 and 14 that the felt or similar material 76 (Fig. 14) not only performs an important filtering function but is an ideal packing material which at all times keeps the tubes separate from each other and always without any strain which is likely to occur when such elements are mounted in metal. Furthermore, the construction lends itself to very easy assembly by unskilled labor.

In the manufacture of automotive filters on a large production basis it is important to have the inner assembly of filter elements self-contained and complete so that it can rapidly be inserted into the casing without the aid of screws, rivets or other auxiliary parts. In the construction shown in Figure 14 it should be noted that felt disc 76 is pliable enough to compress slightly when the assembly is inserted into the slightly tapered walls of the casing, so that a filter-tight joint is formed between the walls of the casing and the felt, without the aid of any auxiliary materials. By a filter-tight joint I mean one which may allow the passage of liquid but prevents the passage of gritty suspended solids.

The joint 73 (Fig. 14) is crimped and either soldered or welded after the assembly has been placed in the casing and it is notable that the filter elements of porcelain are unaffected by the heat of these operations as may be the case where ordinary filter fabrics are used.

Throughout this specification and the following claims where the word "tubular" is used in connection with the filter element it is intended to be considered in its broadest sense and to cover a tube for the purposes described regardless of the exact shape, and in the sense intended such elements as those illustrated in Figures 6, 7, 8, 12, and 13, or any form applicable to the purpose are intended to be included. Where a filter of high density or high resistance is referred to, it is intended to embrace any filter medium such as porcelain that offers a high resistance to the passage of a fluid and consequently requires a substantial pressure to force a liquid through it. Where I refer to a low density or low resistance filter element, I intend to include such materials as may allow fluids to pass at low pressure even though they do not retain extremely fine suspended solids. This embraces such materials as felt, coarse paper pulp, cotton waste, cotton, wool or asbestos fabrics and many other fibrous or granular materials. Where I refer to a non-rigid material as a support or holder for the filter element, it is intended to mean a material which is somewhat pliable and yet firm enough to hold the elements in place. Felt, whether made of cotton, wool, hair or wood pulp, cork, pasteboard and certain forms of asbestos board are typical, but many other substances may be substituted.

It should be understood that heating of the oil to reduce its viscosity during filtration is essential in a filter of the type described for to obtain the same filter capacity with cold oil would require a filter from ten to twenty times as large and a filter of such size would be prohibitive in the automotive art.

If for the sake of simplification it is desired to eliminate the thermostatic control this may be done either by restricting the outer area of the filter casing that is exposed to the exhaust gases or by regulating the flow of exhaust gases to the heating jacket by means of an ordinary valve. In certain cases satisfactory heating may be accomplished by locating the filter adjacent to the exhaust manifold without the necessity of further refinement as a location with respect to the exhaust manifold may be determined by experiment with any particular engine that will maintain the oil within a satisfactory range for filtration without danger of cracking.

Where the term earthen materials is used in this specification and claims it is intended in its broader sense and to mean any materials taken from the earth such as clay, flint, feldspar, kaolin, gypsum, diatomaceous earth, lime and such like materials and mixtures thereof or their derivatives.

While the foregoing specification embraces my preferred forms of the invention, it is capable of many modifications and I limit myself only by the invention as defined in the following claims.

Where the term "threaded" or "threaded through" in the following claims is used it is intended to mean that the tubes are threaded through the header or disc by being caused to penetrate through apertures in said disc and is not intended to mean that they are threaded in the manner of a screw thread.

Where the term "fabric" or "filter fabric" is used in the following claims it is intended to refer to filter material in sheet form such as woven filter cloth or felt and such fabric may be made of woolen or cotton or asbestos materials or of paper pulp or of a mixture of such materials or it may refer to any class of filtering material of a fibrous or hairy nature that may be fabricated into sheets.

Where the term "extruded tubes" or "tubes made by extrusion" is used in the following claims the term is used not only to define the method by which the tubes are made but to define the quality or particular characteristics of the tubes since tubes made in this manner possess a surface and texture that differs from tubes made by other methods even though the chemical composition of materials used may be the same in both cases.

I claim:

1. A filter comprising a plurality of porous tubes, a header of porous material through which said tubes are threaded, a filter casing within which said tubes and header are mounted, said header forming a porous partition in said casing, and an auxiliary filter within said casing between said header and the outlet opening in said casing.

2. A filter comprising a plurality of porous tubes each having an open end, a porous disc with perforations to receive the open ends of said tubes, a casing to receive said tubes and disc, an inlet and outlet opening in said casing, an auxiliary filter across said casing at right angles to the axis of said tubes and parallel to said disc, said auxiliary filter forming a septum between said tubes and said outlet in said casing.

3. In combination with the oil circulatory system of an internal combustion engine an oil filter comprising a plurality of filter tubes mounted in a casing, said tubes being mounted in a header of greater porosity than said filter tubes.

4. A filter comprising a plurality of porous tubes of filtering material, a porous disc penetrated by said tubes and serving as a support therefor, said disc and said tubes being mounted within a casing, an inlet opening in said casing on one side of said disc and an outlet opening on the opposite side thereof, said disc having a higher degree of porosity than said tubes.

5. A filter comprising a casing, a plurality of porous filter tubes in said casing, a perforate felt header penetrated by said tubes and acting as a support therefor, an inlet opening in said casing on one side of said header and an outlet opening in said casing on the opposite side of said header.

6. A filter comprising a cylindrical casing formed from a pair of drawn shells each having an end completely closed except for a conduit-receiving aperture, the closed ends of said shells being of slightly smaller diameter than the open ends thereof, a plurality of filter tubes each having an open end in one end of said casing, a pair of perforate headers for supporting said tubes in said casing, one of said headers being of porous filtering material which is compressed by being forced from the open end of said casing into the smaller closed end thereof thereby forming a filter-tight joint with the walls of said casing in the end thereof adjacent the open ends of said tubes.

7. A filter comprising a casing, said casing being formed with a drawn shell having one end closed and the other end open, said closed end being of slightly smaller diameter than said open end, an aperture for an eduction tube in said closed end, a plurality of porous filter tubes enclosed within said casing, a perforate header within which said tubes are mounted, said header being formed of porous filtering material which is compressed when forced into the smaller end of said shell thereby forming a filter tight joint with the walls thereof.

8. A filter comprising a two part casing, each of said parts having a flanged open end and the opposite ends closed except for conduit-engaging apertures, said flanged open ends being of slightly larger diameter than said closed ends, the open ends having their flanges crimped together to form a fluid-tight joint, a plurality of porous filter tubes in said casing, said tubes being supported by a perforate header of porous material of such diameter as to form a filter-tight joint with the walls of one of said shells at a point adjacent the closed end thereof.

9. A filter comprising a fluid-tight casing, a perforate header, a plurality of tubes mounted in said header and assembled in said casing, said header being of porous compressible material and of slightly larger diameter than the interior of said casing before being assembled therein, a drainage member between an end of said casing and said header, an inlet and an outlet opening in said casing.

10. A filter casing constructed from a pair of drawn shells having their open ends sealed together, a filter assembly within said casing comprising a plurality of porous tubes mounted at one end in a perforate header of porous compressible material and at the opposite end in a header having perforations in registration with said first mentioned header, each of said headers being supported by the inner walls of one of said shells, an inlet and outlet opening in said casing.

ERNEST J. SWEETLAND.